United States Patent [19]
Horst

[11] 3,787,021
[45] Jan. 22, 1974

[54] BINOCULAR HOLDER
[75] Inventor: Thomas A. Horst, Lafayette, Colo.
[73] Assignee: Western Sales and Supply Co., Denver, Colo.
[22] Filed: Aug. 7, 1972
[21] Appl. No.: 278,579

[52] U.S. Cl............................................ 248/316 B
[51] Int. Cl............................................ F16m 13/00
[58] Field of Search......... 248/154, 311, 313, 316 B

[56] References Cited
UNITED STATES PATENTS

| | | | |
|---|---|---|---|
| 820,708 | 5/1906 | Durfey | 248/313 |
| 1,328,271 | 1/1920 | Dutemple | 248/313 |
| 2,734,711 | 2/1956 | Shippen | 248/313 |

Primary Examiner—William H. Schultz
Attorney, Agent, or Firm—Anderson et al.

[57] ABSTRACT

This invention relates to an adjustable carrier for use in automobiles and the like as a means to releasably hold a pair of binoculars ready for instant use. It comprises a horizontally disposed padded platform upon which the objective lenses rest that has a pair of parallel upright posts at the rear edge thereof that are slidably received in the parallel flanges of a channel-shaped mounting bracket. The web of said bracket mounts one leaf of a spring hinge, the remaining leaf of which is fastened atop a foldable pad that is biased down on top of the binocular eyepieces thus cooperating with the platform to releasably retain same.

6 Claims, 4 Drawing Figures

PATENTED JAN 22 1974 3,787,021

BINOCULAR HOLDER

Hunters, birdwatchers, ranchers, forest rangers and many other people like to carry a pair of binoculars along with them in the car when traveling in order to better observe the wildlife along with other natural phenomena. To do so ordinarily means keeping the binoculars in their case on the seat beside the driver in order to prevent them from becoming scratched or damaged. As such, they are not available for immediate use and all too often the animals and birds one wishes to observe through the binoculars are long gone before they can be extricated from the case, focused and readied for use.

It has now been found in accordance with the teachings of the instant invention that a simple, yet unusual, binocular holder for attachment to the dashboard of an automobile can be made that eliminates the inconvenience of keeping them in a case while, at the same time, giving them adequate protection. Soft pads engage both the eyepiece and objective lenses in a manner to both protect them from damage and keep them free of dust and dirt. The supporting platform is vertically adjustable relative to the foldable pad so as to accommodate units of different overall lengths. Also, by locating the posts at the rear of the supporting platform, the weight of the binoculars resting upon the latter tend to bind the posts in the bracket thus maintaining the desired adjusted position in the absence of a positive mechanical lock which can, of course, be used. Most significant, however, is the ease with which the binoculars can be removed from the holder by merely pulling them free thereof. Then, in order to reinsert them back into the holder, one need only lift the foldable pad, place the binoculars therebeneath and allow the pad to spring back down on top thereof.

Accordingly, it is the principal object of the present invention to provide a novel and improved binocular holder.

A second objective of the within described invention is the provision of a holder for binoculars, radio's, cameras and the like that is readily adaptable to those of various sizes, shapes and styles.

Another object is the provision of a unit mountable upon the dashboard of an automobile or the like that can be used for the other purposes than carrying binoculars such as, for example, carrying open-topped liquid-filled containers without spilling the contents.

Still another objective of the invention herein disclosed and claimed is to provide a means for carrying binoculars that protects them against damage while, at the same time, keeping them available for instant use.

An additional object of the invention forming the subject matter hereof is the provision of a binocular holder designed such that the binoculars themselves coact with the unit to maintain the adjusted relation between the supporting platform and pad.

Further objects of the invention are to provide a binocular holder that is simple, versatile, relatively inexpensive, safe reliable and even decorative in appearance.

Other objects will be in part apparent and in part pointed out specifically hereinafter in connection with the description of the drawing that follows, and in which.

Figure 1:
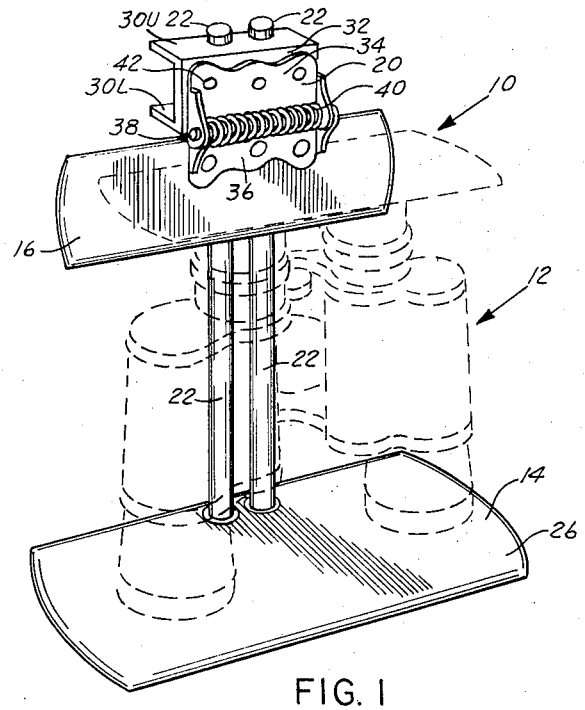
FIG. 1 is a perspective view looking down and to the right upon the binocular holder of the present invention, the binoculars having been represented by phantom lines.

Referring next to the drawings for a detailed description of the present invention, reference numeral 10 has been chosen to represent the binocular holder in its entirety while numeral 12 similarly designates the binoculars carried thereby. The several elements of the holder consist of a padded supporting platform 14, a foldable pad 16 movable relative to the latter into opposed parallel relation thereto, a mounting bracket 18, a spring-biased hinge attaching the pad to the face of the mounting bracket for movement between its folded and extended positions, and a pair of upright posts 22 adjustably interconnecting the supporting platform and mounting bracket.

Figure 2:
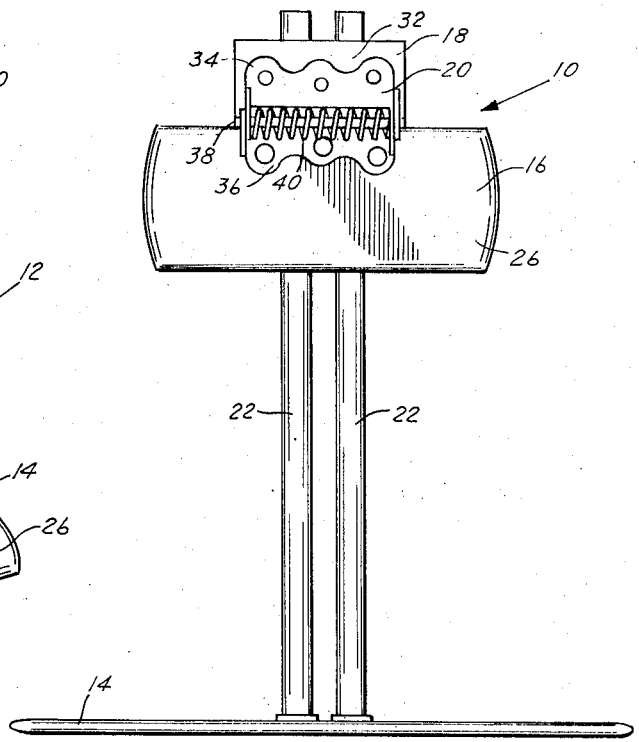
FIG. 2 is a front elevation to the same scale as FIG. 1.
Figure 3:
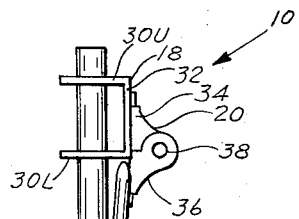
FIG. 3 is a left side elevation to the same scale as FIGS. 1 and 2.
Figure 4:
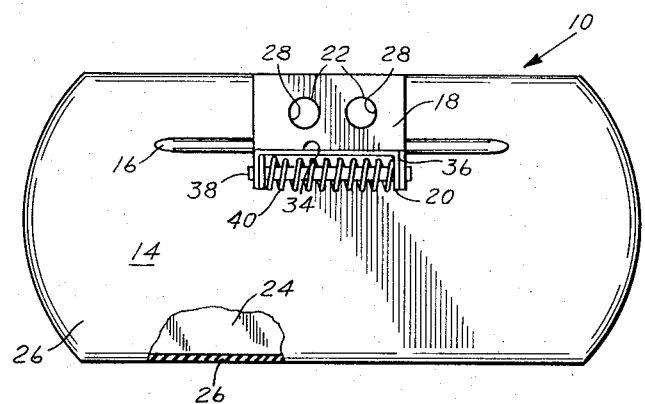
FIG. 4 is a top plan view of the unit to a larger scale than FIG. 1, portions of which have been broken away to reveal the interior construction.

In the particular form illustrated, platform 14 comprises a rigid flat metal plate 24 (FIGS. 2 and 4) covered on at least the upper face thereof by a resilient cushion 26. Foldable pad 16 is similarly constructed except that when only one of the two faces is cushioned, it must be the lower one rather than the upper as was the case with platform 14. As illustrated, both faces as well as the margins of the pad and platform as cushioned.

The shape of the platform and pad is not critical so long as they provide a sufficient area to encompass the lens pairs they are designed to contact. Since the objective lenses are usually somewhat larger in diameter and spread farther apart than the ocular lenses, platform 14 is made larger than pad 16. Both are shown provided with rounded ends to eliminate any sharp corners.

Approximately midway between the ends of platform 14 adjacent the rear edge thereof are fastened the twin posts 22 which project upwardly therefrom in perpendicular relation thereto as well as spaced parallel relation to one another. These posts are shown as being round although they could have other cross sections. To do so, however, would serve no useful purpose and, in fact, would complicate the unit by making the holes 28 in the bracket flanges 30 somewhat more difficult and expensive to make.

Bracket 18 has a channel-shaped configuration with upper and lower spaced parallel flanges 30V and 30L interconnected by a vertically-disposed web 32. These flanges included vertically-aligned upper an lower pairs of apertures 28 sized and spaced to slidably receive the posts 22. It is obvious that by sliding the posts 22 up and down relative to bracket 18, the vertical spacing between the platform and pad can be adjusted to accommodate binoculars of different overall lengths.

Fixed leaf 34 of hinge 20 is permanently fastened to the exterior face of bracket web 32 while movable leaf 36 is similarly attached to the plate beneath the cushion 26 of pad 16. Hinge pin 38 carries a torsion spring 40 that normally biases the movable leaf from its folded position in essentially perpendicular relation to the fixed leaf into its extended or essentially planar relation to the latter. As such, the hinge member tends to keep pad 16 folded down and back against the posts as shown in full lines. Alternatively, when the pad is lifted into its broken line operative position shown in FIG. 1, the spring will bias it down atop the ocular lens mounts of a pair of binoculars placed therebeneath thus holding its objective lens mounts securely atop the platform 14. To remove the binoculars, one need only pull them out from between the pad and platform.

The weight of the binoculars resting on the front of platform 14 combine with the pressure exerted thereon by pad 16 to tilt the posts 22 within the apertures in bracket 18 thus maintaining the adjusted relation between said pad and platform. Alternatively, when the unit is not in use, the pad 16 folds down and back tightly against these same posts 22 thus preventing the bracket from sliding down the latter.

Fastening the unit to the dashboard can be accomplished in several ways, perhaps the simplest of which is to merely pass a pair of screws through apertures 42 fixed leaf and bracket 18 alongside posts 22. Such a method of mounting the unit has the advantage of enabling the platform and post subassembly to be removed and stored elsewhere when no binoculars are being carried. This leaves the pad folded back out of the way against the dashboard.

What is claimed is:

1. The binocular holder which comprises: bracket means attachable to a suitable supporting surface; post means adjustably attached to said bracket for vertical movement relative thereto; horizontally disposed platform means fixedly attached to the lower end of said post means in position to project forwardly therefrom; means comprising a foldable pad hingedly attached to said bracket means for swinging movement about a horizontal axis between a retracted inoperative position back against the post means and an extended operative position in spaced substantially parallel relation above the platform; and, spring means operatively connected between said bracket means and pad normally biasing the latter into retracted position, said spring means cooperating with said platform means and pad to releasably retain a pair of binoculars therebetween.

2. The binocular holder as set forth in claim 1 in which: a resilient cushion covers the opposed surfaces of the pad and platform means.

3. The binocular holder as set forth in claim 1 in which: the bracket means includes a pair of vertically-spaced horizontally disposed flanges with at least one pair of vertically aligned apertures therein; and, the post means is nonrotatably mounted with the aligned apertures for vertical slidable movement so as to adjust the spacing between the platform means and pad.

4. The binocular holder as set forth in claim 3 in which: the spring means coacts with the pad to bias same back against the post means in inoperative position to maintain the adjusted position of the bracket means.

5. The binocular holder as set forth in claim 3 in which: the post means comprise a pair of vertically disposed posts arranged in transversely spaced parallel relation to one another; and, in which the flanges of the bracket means include two pairs of vertically aligned apertures spaced and sized to slidably receive the pair of posts.

6. The binocular holder as set forth in claim 3 in which: the weight of the binoculars resting atop the platform means cooperates with the pad in operative position pressing down thereon to tilt the post means within the aligned apertures thus binding same to maintain the adjusted relation therebetween.

* * * * *